(12) United States Patent
Wei

(10) Patent No.: US 9,553,444 B2
(45) Date of Patent: Jan. 24, 2017

(54) METHOD AND DEVICE FOR SUPPRESSING HIGH-VOLTAGE ELECTRICITY

(71) Applicant: MOBILETRON ELECTRONICS CO., LTD., Taichung (TW)

(72) Inventor: Chen-Ku Wei, Taichung (TW)

(73) Assignee: MOBILETRON ELECTRONICS CO., LTD., Taichung (TW)

(*) Notice: Subject to any disclaimer, the term of this patent is extended or adjusted under 35 U.S.C. 154(b) by 0 days.

(21) Appl. No.: 14/966,926

(22) Filed: Dec. 11, 2015

(65) Prior Publication Data
US 2016/0190796 A1    Jun. 30, 2016

(30) Foreign Application Priority Data

Dec. 26, 2014  (TW) .............................. 103145823 A

(51) Int. Cl.
*H02P 25/30* (2006.01)
*H02H 7/125* (2006.01)
*H02H 3/20* (2006.01)

(52) U.S. Cl.
CPC ............. *H02H 7/1252* (2013.01); *H02H 3/20* (2013.01)

(58) Field of Classification Search
CPC ............... H02J 7/10; H02P 9/00; H02P 21/00; H02P 23/00; H02P 25/00; H02P 27/00
USPC .... 318/139, 400.01, 400.26, 400.27, 400.28, 318/700, 701, 140, 141, 147, 150, 151, 318/152, 153, 154, 156, 157, 158, 400.14, 318/800, 801, 430, 432; 320/104, 119, 320/128, 136, 137, 141, 142, 145, 149, 320/151, 152, 161, 162, 165; 363/40, 61, 363/44, 67, 81, 86, 87, 95, 108, 174, 175
See application file for complete search history.

(56) References Cited

U.S. PATENT DOCUMENTS 5,719,484 A * 2/1998 Taniguchi ............. H02J 7/1438
322/20
6,856,040 B2   2/2005 Feddersen et al.

FOREIGN PATENT DOCUMENTS

| TW | 200616310 | 5/2006 |
|---|---|---|
| TW | 201404014 A | 1/2014 |
| TW | 201429148 A | 7/2014 |

* cited by examiner

*Primary Examiner* — Antony M Paul
(74) *Attorney, Agent, or Firm* — Ming Chow; Sinorica, LLC

(57) ABSTRACT

A device for suppressing high-voltage electricity is connected to a three-phase circuit of an electric generator, including three up arm semiconductor switches, three low arm semiconductor switches, three reverse breakdown diodes respectively connected to the low arm semiconductor switches in parallel, and a control circuit sending PWM signals to turn on and off the low arm semiconductor switches sequentially to evenly share and absorb the energy of surge voltage. Each of the up arm semiconductor switches has a first terminal and a second terminal, wherein the first terminals are electrically connected together, and the second terminals are respectively electrically connected to one of three coils of the three-phase circuit. Each of the low arm semiconductor switches has a first terminal and a second terminal, wherein the first terminals are respectively electrically connected to the second terminals of the up arm semiconductor switches, and the second terminals are electrically connected together.

13 Claims, 4 Drawing Sheets

METHOD AND DEVICE FOR SUPPRESSING HIGH-VOLTAGE ELECTRICITY

The current application claims a foreign priority to application number 103145823 filed on Dec. 26, 2014 in Taiwan.

BACKGROUND OF THE INVENTION

1. Technical Field

The present invention relates generally to a device for suppressing high-voltage electricity, and more particularly to a method and device applied in vehicles to suppress high-voltage electricity generated in a generator.

2. Description of Related Art

In recent years, vehicles are driven by high power, so that the generator thereof should generate high-current electricity. The conventional rectification having a diode with a P-N junction can't afford such high-current electricity.

In present days, metal-oxide-semiconductor field-effect transistors (MOSFETs) are widely used since they could be switched fast, and have a lower forward bias to reduce the heat generating. For example, if a 100A current is transmitted to a MOSFET with 1 mΩ conducting resistance (Rds(on)), there only is a potential drop of 0.1V. However, it will be 1.0V for a conventional diode, so that the MOSFET only generates one to tenth of the heat of the diode. The MOSFET in an electric generator may reduce the heat, and therefore it can save the heat dissipating device in the electric generator to reduce the weight, and save the energy.

However, for the electric generator installed in a vehicle, such as a micro hybrid vehicle with a start-stop system, it has to face the problem of load dump, which generates surge voltage. It is an important issue to deal with the surge voltage, which may damage electronic elements.

A conventional way of suppressing the surge voltage is cutting the generator off immediately while the surge voltage is appearing, and simultaneously conducting three MOSFETs of low arms to convert the energy of the surge voltage into heat. Typically, the surge voltage has high voltage and high energy, so that there will be an extreme high current transmitting through the MOSFETs, even there are many MOSFETs. However, the current and the heat concentrate in three MOSFETs. Therefore, in practice, a chip with larger power and size and a heat sink with high thermal capacity are needed to solve this problem. However, it doesn't get a good result, and furthermore, such MOSFETs are very expensive.

BRIEF SUMMARY OF THE INVENTION

In view of the above, the primary objective of the present invention is to provide a method and a device of suppressing high-voltage electricity, which is able to evenly share and absorb the heat of the surge voltage to suppress the suppressing high-voltage electricity.

The present invention provides a device for suppressing high-voltage electricity, wherein the device is electrically connected to a three-phase circuit of an electric generator, and includes three up arm semiconductor switches, three low arm semiconductor switches, three reverse breakdown diodes, and a control circuit. The up and the low arm semiconductor switches each has a first terminal and a second terminal, wherein the first terminals of the up arm semiconductor switches are electrically connected together, and the second terminals thereof are electrically connected to three coils of the three-phase circuit respectively; the first terminals of the low arm semiconductor switches are electrically connected to the second terminals of the up arm semiconductor switches respectively, and the second terminals thereof are electrically connected together. Each of the reverse breakdown diodes has an anode and a cathode, wherein the anodes of the diodes are respectively electrically connected to the second terminals of the low arm semiconductor switches; the cathodes of the diodes are respectively connected to the first terminals of the low arm semiconductor switches. The control circuit is electrically connected to the low arm semiconductor switches, wherein the control circuit sending PWM (pulse width modulation) signals to turn on and off the low arm semiconductor switches.

The present invention further provides a method for suppressing high-voltage electricity, which is applied in the device as described above, including: A. Sense a voltage outputted by the three-phase circuit or a voltage provided to a battery, and compare the voltage with an upper-bound voltage. B. Turn off an excitation current of the electric generator to stop generating electric power, and control the control circuit to provide PWM signals to the low arm semiconductor switches to turn on and off the low arm semiconductor switches accordingly if the voltage is higher than the upper-bound voltage; and C. Repeat step A if the voltage is lower than the upper-bound voltage.

With the design of the present invention, the semiconductor switches can be turned on and off through the PWM signals, whereby the energy of the surge voltage can be effectively shared and absorbed by the diodes and the semiconductor switches.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
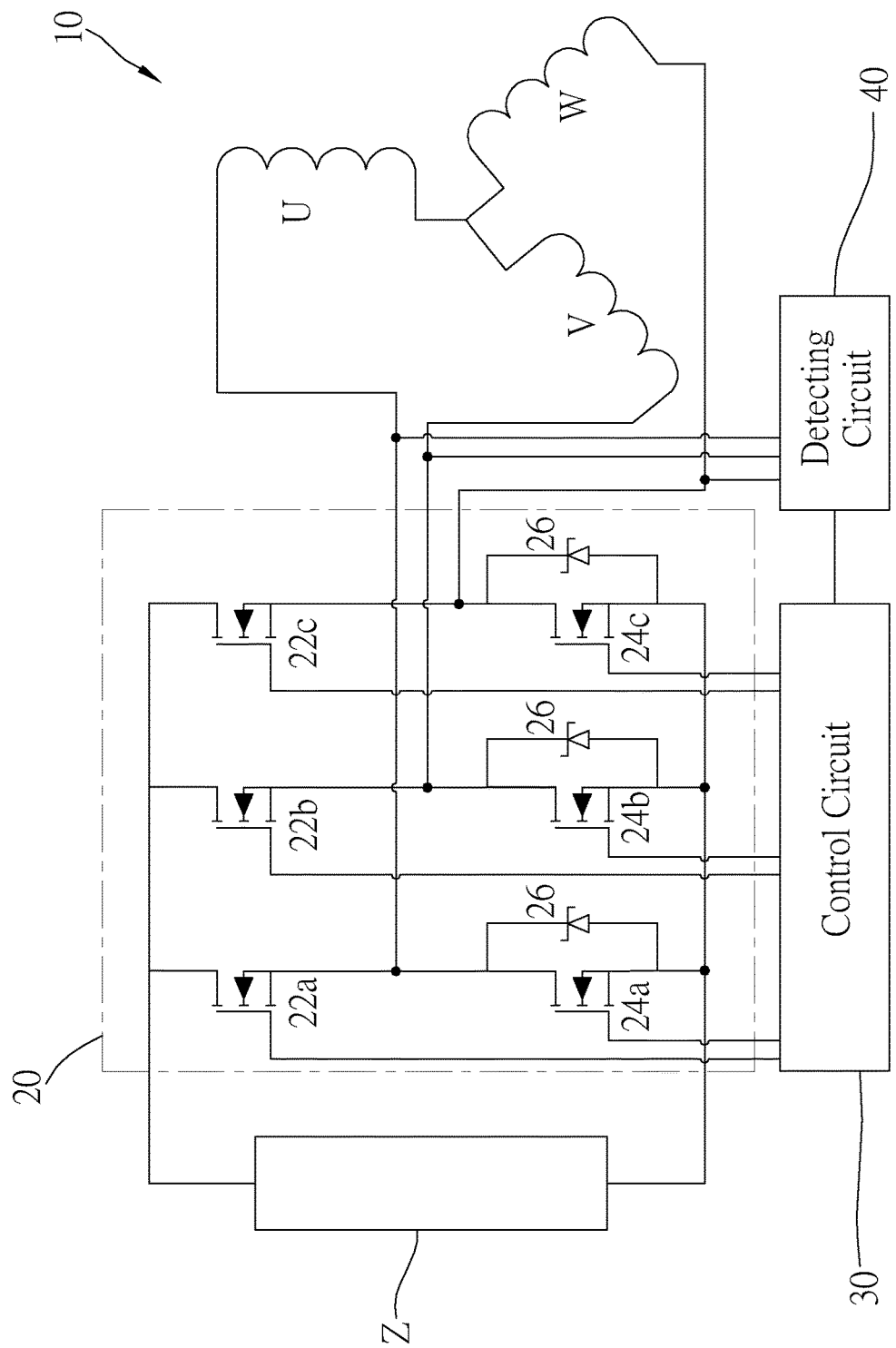
FIG. 1 is a circuit of a first preferred embodiment of the present invention.

As shown in FIG. 1, a device for suppressing high-voltage electricity of the first preferred embodiment of the present invention is connected to a three-phase circuit 10 of an electric generator and a loading Z respectively. In the present embodiment, the loading Z is a battery, and more precisely, it is a battery installed in a vehicle. The device includes a rectifying circuit 20, a control circuit 30, and a detecting circuit 40.

The three-phase circuit 10 could have a wye circuit or a delta circuit to generate AC electric power, such as sine-wave voltage. In the present embodiment, the three-phase circuit 10 has a wye circuit.

The rectifying circuit 20 has three up arm semiconductor switches 22a, 22b, 22c, three low arm semiconductor switches 24a, 24b, 24c, and three reverse breakdown diodes 26. In resent embodiment, each of the semiconductor switches has a MOSFET, and the diodes 26 are Zener diodes as an example. In other embodiments, other kinds of reverse breakdown diodes, such as avalanche diodes, can be also selected.

Each of the up arm semiconductor switches 22a, 22b, 22c has a first terminal (drain) and a second terminal (source). The first terminals of the up arm semiconductor switches 22a, 22b, 22c are electrically connected together, and the second terminals thereof are electrically connected to a U phase coil, a V phase coil, and a W phase coil of the three-phase circuit 10 respectively.

Each of the low arm semiconductor switches 24a, 24b, 24c has a first terminal (drain) and a second terminal (source). The first terminals of the low arm semiconductor switches 24a, 24b, 24c are electrically connected to the second terminals of the up arm semiconductor switches 22a, 22b, 22c, and the second terminals thereof are electrically connected together.

Each of the diodes 26 has a positive terminal and a negative terminal. The positive terminals of the diodes 26 are electrically connected to the second terminals of the low arm semiconductor switches 24a, 24b, 24c respectively, and the negative terminals thereof are electrically connected to the first terminals of the low arm semiconductor switches 24a, 24b, 24c respectively. The control circuit 30 is electrically connected to gates of the up arm semiconductor switches 22a, 22b, 22c and the low arm semiconductor switches 24a, 24b, 24c respectively to turn off the up arm semiconductor switches 22a, 22b, 22c, and send the low arm semiconductor switches 24a, 24b, 24c a pulse width modulation signal to turn off the low arm semiconductor switches 24a, 24b, 24c on and accordingly.

Figure 2:
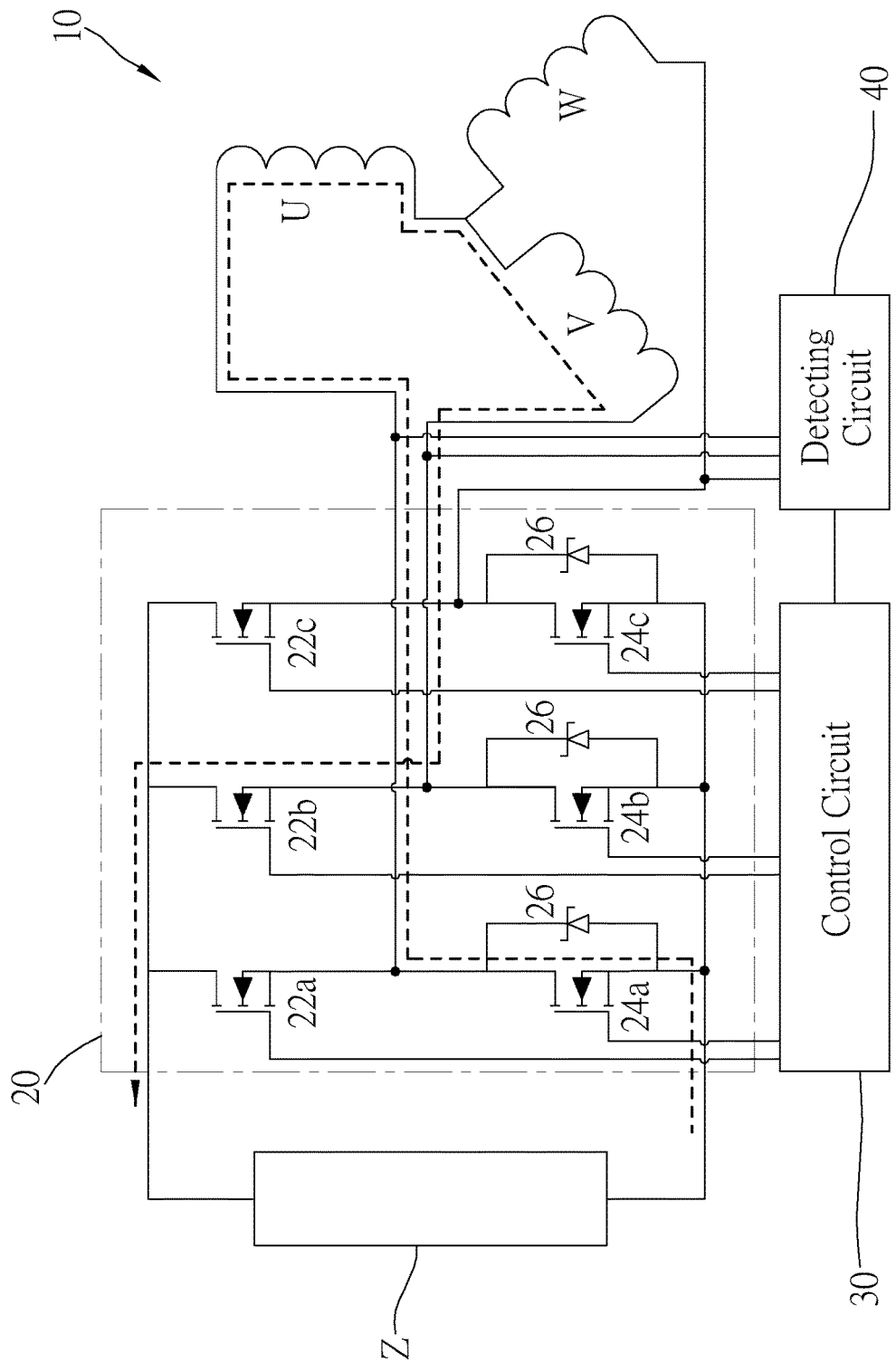
FIG. 2 is a circuit of the first preferred embodiment of the present invention, showing the path of the current when two phases of the three-phase circuit are conducted.
Figure 3:
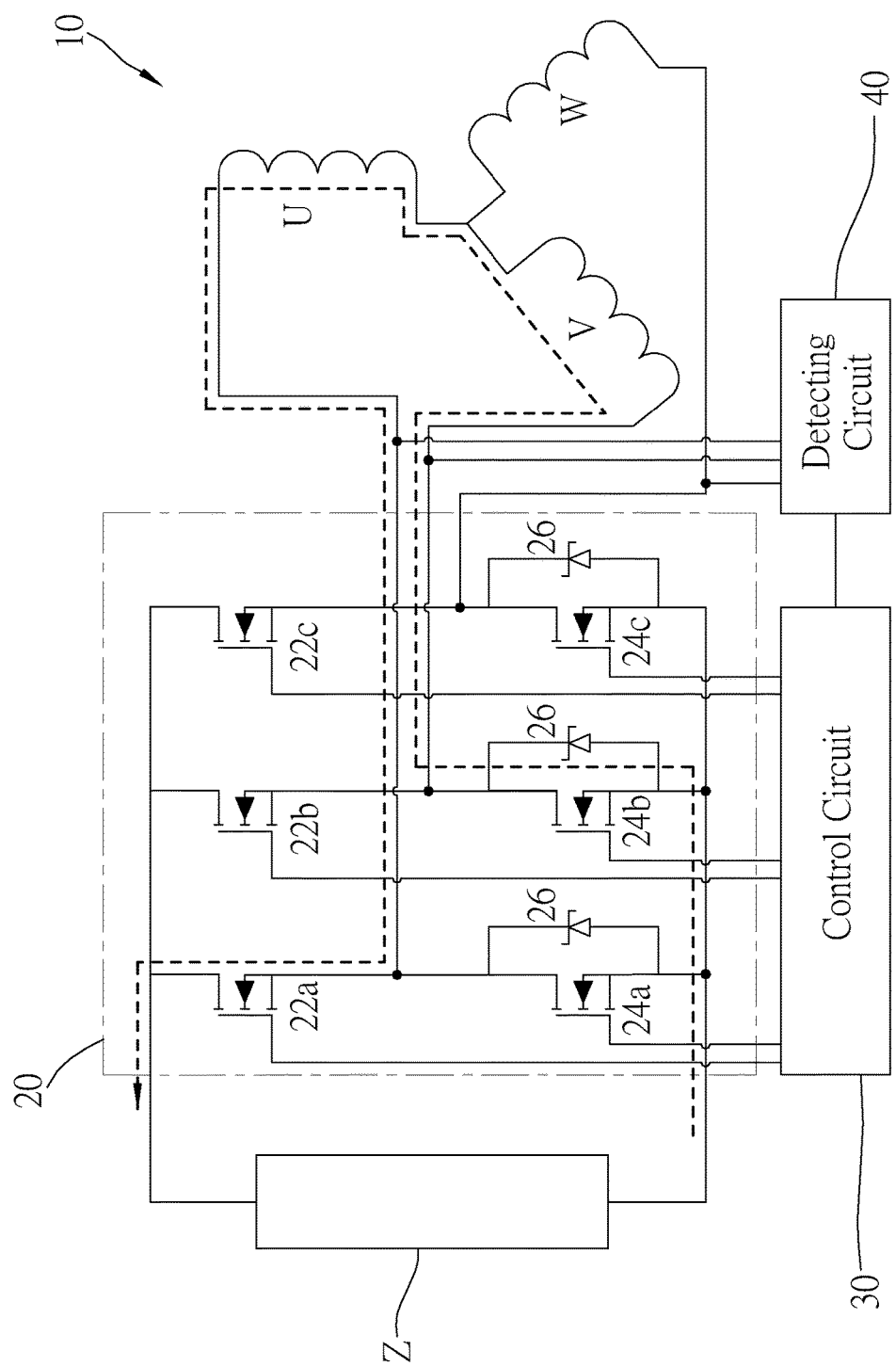
FIG. 3 is a circuit of the first preferred embodiment of the present invention, showing another path of the current when two phases of the three-phase circuit are conducted.

As shown in FIG. 2, when the three-phase circuit 10 generates a sine wave voltage, and the U phase coil has negative potential and the V phase coil has positive potential, the up arm semiconductor switches 22b and the low arm semiconductor switch 24a are turned on, and the rest switches 22a, 22c, 24b, 24c are turned off. At this time, the diode 26 is connected to the low arm semiconductor switches 24a in parallel, and connected to the up arm semiconductor switch 22b in series. As shown in FIG. 3, on the contrary, when the U phase coil has positive potential and the V phase coil has negative potential, the up arm semiconductor switches 22a and the low arm semiconductor switch 24b are turned on instead (the rest switches are turned off). The AC power of the three-phase circuit 10 is transmitted to the rectifying circuit 20 for full wave rectification, and the DC power generated by the rectifying circuit 20 is transmitted to the loading Z.

The other two combinations of the three-phase circuit 10, U-W and V-W, have the same principle, so we do not describe the detail again.

The detecting circuit 40 has a terminal connected to the U phase coil, the V phase coil, and the W phase coil of the three-phase circuit 10, and a terminal connected to the control circuit 30 to detect a voltage of the AC electric power generated by the three-phase circuit 10. When voltage outputted from any coil of the three-phase circuit 10 is greater than an upper-bound voltage and is detected by the detecting circuit 40, the electric generator stops to generate excitation current so as to stop generating AC electric power. Next, the detecting circuit 40 sends the control circuit 30 a signal to make the control circuit 30 generates PWM signals.

Figure 4:
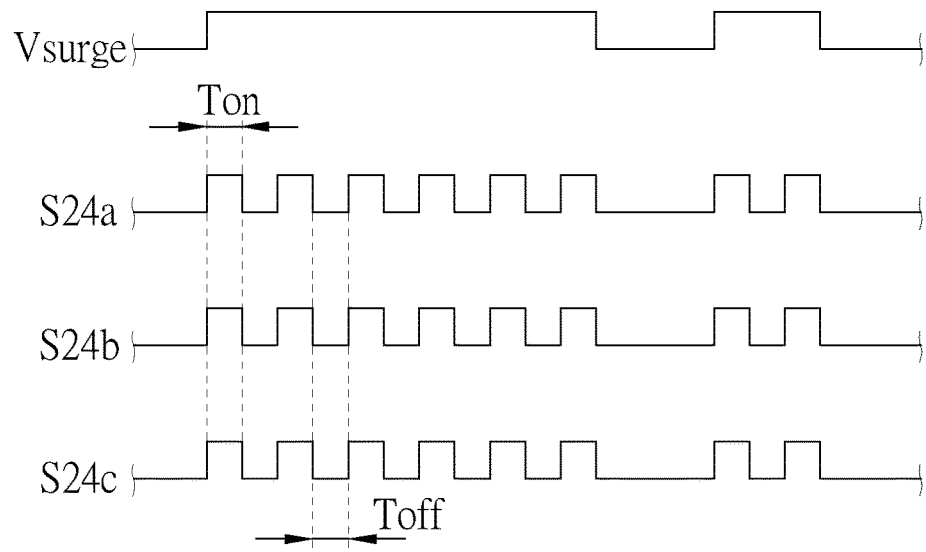
FIG. 4 is a PWM wave diagram of the first preferred embodiment of the present invention.

For example, given that the three-phase circuit 10 of the electric generator generates AC electric power about 36V, and the upper-bound voltage is set to be 45V. The waveform denoted by $V_{surge}$ in FIG. 4 represents the situation of having surge voltage. More specifically, $V_{surge}$ at high potential means there is surge voltage, and $V_{surge}$ at low potential means the surge voltage is gone, or there is no surge voltage at that time point. The electric generator is stopped to generate excitation current so as to stop generating AC electric power when the electric generator generates surge voltage, and voltage of one or at least one of the coils is detected that is greater than 45V. At this time, as shown in FIG. 4, the control circuit 30 generates PWM signals S24a, S24b, and S24c, and sends them to the gates of the low arm semiconductor switches 24a, 24b, 24c respectively. The low arm semiconductor switches 24a, 24b, 24c will be turned on and off according to the PWM signals S24a, S24b, and S24c. In more details, during a time period of high potential (Ton), the PWM signals S24a, S24b, and S24c are high potential signals, which turn on the low arm semiconductor switches 24a-24c. At this time, the low arm semiconductor switches 24a-24c absorbs and consumes the energy of the surge voltage.

On the other hand, the PWM signals S24a, S24b, and S24c are low potential signals during a time period of low potential (Toff), which turn off all the low arm semiconductor switches 24a, 24b, 24c and make the diodes 26 conduct. At this time, the energy of surge voltage is transmitted through the diodes 26 respectively to be absorbed.

It is worth mentioning that, in an alternative embodiment, the electric generator further includes a stator coil (not shown), which senses an electrical torque of the three-phase circuit 10 to generate electricity. Furthermore, the control circuit 30 controls the frequency of the generated PWM signals according to the frequency of the voltage waveform sensed by the stator coil, wherein, preferably, the frequency of the PWM signals generated by the control circuit 30 is higher than the frequency of the voltage waveform sensed by the stator coil. For example, if the frequency of the voltage waveform sensed by the stator coil is 250 Hz, then the frequency of the PWM signals generated by the control circuit 30 is higher than 250 Hz, and is preferable to be 300 Hz, 350 Hz, or even 500 Hz and above. Whereby, the low arm semiconductor switches 24a-24c can be further effectively turned on and off to share and absorb the high energy of a surge voltage.

In addition, because a surge voltage does not simply happen on one single phase circuit, but more likely to sequentially or randomly happen on different phase circuits while each phase circuit of the three-phase circuit is in operation. Therefore, in addition to control the frequency of the generated PWM signals to be higher than the frequency of the voltage waveform sensed by the stator coil of the electric generator, it is preferable to simultaneously or substantially simultaneously transmit PWM signals, which have the same, substantially the same, or similar waveforms and duty cycles, from the control circuit 30 to each of the low arm semiconductor switches 24a-24c, or the PWM signals can be outputted from the same signal sources. In this way, no matter how the operational situation of the three-phase circuit goes on, the corresponding semiconductors and diodes are ensured to share the high energy generated by the surge voltage, which provides an excellent effect of suppressing surges.

The surge voltage would be shared and absorbed by the rectifying circuit 20 because of the PWM signals of the control circuit 30. At the same time, the detecting circuit 40 keeps sensing the voltages of the coils of the three-phase circuit 10. If the sensed voltages are lower than the upper-bound voltage, the electric generator is started to generate the excitation current again for generating electric power. If any of the sensed voltages are higher than the upper-bound voltage, the control circuit 30 keeps sending the PWM signals to the rectifying circuit 20 to suppressing the surge voltage.

Figure 5:
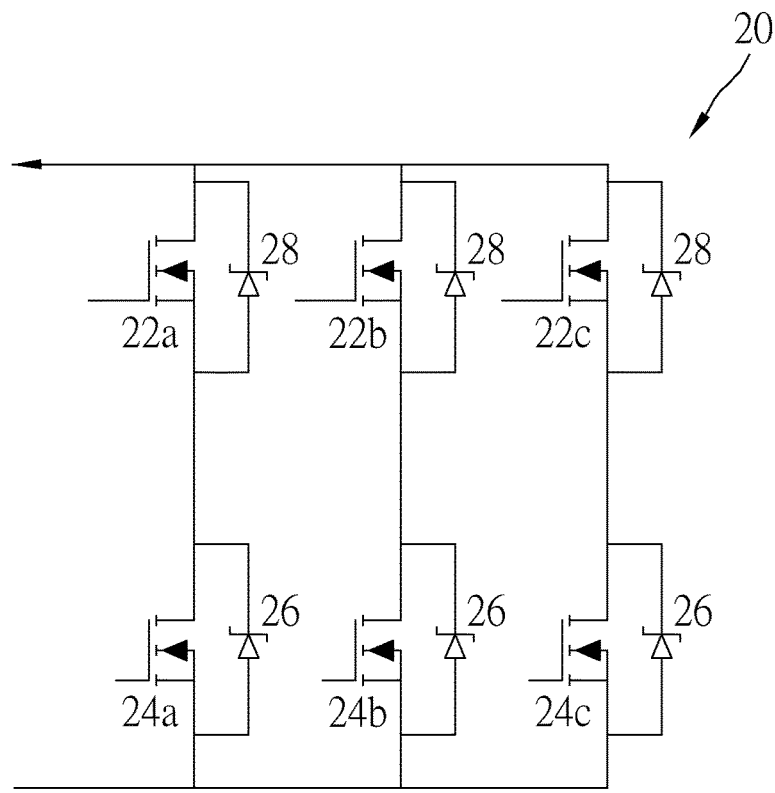
FIG. 5 shows the rectifying circuit of a second preferred embodiment of the present invention.

FIG. 5 shows a device of suppressing high-voltage electricity of the second preferred embodiment of the present invention capable of further increasing the tolerance of an electric generator to withstand surge voltage, which is the same as the first preferred embodiment, except that it further includes three avalanche diodes 28 respectively connected to the up arm semiconductor switches 22a, 22b, 22c in parallel. The device of the second preferred embodiment is applied in an electric generator generating large power, such as 48V or higher, which would have a large surge voltage. The diodes 28 would join to share and absorb the energy of the surge voltage.

In conclusion, the present invention provides the up arm semiconductor switches and the low arm semiconductor switches to be turned on and off by the control of the PWM signals provided by the control circuit, whereby the energy of the surge voltage can be effectively shared by the diodes and the semiconductor switches together. Therefore the prevent invention could help to withstand the impact of the surge voltage as well as reduce the heat generated by the electric generator and save energy.

There still are several equivalent designs which are not described, such as the control circuit could be integrated in a voltage adjusting circuit or in a motor driving circuit of the electric generator to lower the cost. Instead of being connected to the three-phase circuit 10 and the rectifying circuit 20, the detecting circuit could be alternatively connected to the rectifying circuit 20, the loading Z, and the control circuit 30 respectively to sense the voltage received by the loading Z (e.g., the voltage provided to a battery). If the voltage is higher than the upper-bound voltage, the excitation current of the electric generator is turned off to stop generating electric power; otherwise, the sensing goes on. It provides the same function as the aforementioned embodiments. Similarly, the control circuit 30 outputs PWM signals to the low arm semiconductor switches 24a-24c, whereby the low arm semiconductor switches 24a-24c are turned on and off, which also achieves the objective of sharing the high energy of the surge voltage.

Furthermore, each of the up/low arm semiconductor switches could have two or more MOSFETs to share absorb high surge voltage.

It must be pointed out that the embodiments described above are only some preferred embodiments of the present invention. All equivalent structures and methods which employ the concepts disclosed in this specification and the appended claims should fall within the scope of the present invention.

What is claimed is:

1. A device for suppressing high-voltage electricity, wherein the device is electrically connected to a three-phase circuit of an electric generator, comprising:
  three up arm semiconductor switches each having a first terminal and a second terminal, wherein the first terminals of the up arm semiconductor switches are electrically connected together, and the second terminals thereof are electrically connected to coils of the three-phase circuit respectively;
  three low arm semiconductor switches each having a first terminal and a second terminal, wherein the first terminals of the low arm semiconductor switches are electrically connected to the second terminals of the up arm semiconductor switches respectively, and the second terminals thereof are electrically connected together;
  three reverse breakdown diodes, each of which has an anode and a cathode, wherein the anodes of the diodes are respectively electrically connected to the second terminals of the low arm semiconductor switches; the cathodes of the diodes are respectively connected to the first terminals of the low arm semiconductor switches; and
  a control circuit electrically connected to the low arm semiconductor switches, wherein the control circuit sending PWM (pulse width modulation) signals to turn on and off the low arm semiconductor switches;
  receives an alternating current outputted by the three-phase circuit, and converts the received alternating current to be provided to a battery; the device further comprises a detecting circuit; a side of the detecting circuit is connected to the three-phase circuit or the battery, and another side thereof is connected to the control circuit; when a voltage outputted by the three-phase circuit or a voltage provided to the battery sensed by the detecting circuit is higher than an upper-bound voltage, the detecting circuit outputs a signal to the control circuit, so that the control circuit is controlled to generate the PWM signals to sequentially turn on and off the low arm semiconductor switches.

2. The device for suppressing high-voltage electricity of claim 1, wherein, during a time period of high potential, the PWM signals are high potential signals, which turn on all of the low arm semiconductor switches.

3. The device for suppressing high-voltage electricity of claim 1, wherein, during a time period of low potential, the PWM signals are low potential signals, which turn off all of the low arm semiconductor switches, and make the diodes conduct.

4. The device for suppressing high-voltage electricity of claim 1, wherein the control circuit simultaneously provides the same PWM signals to each of the low arm semiconductor switches.

5. The device for suppressing high-voltage electricity of claim 1, further comprising three more reverse breakdown diodes, each of which has an anode and a cathode, wherein the anodes of said diodes are respectively electrically connected to the second terminals of the upper arm semiconductor switches; the cathodes of said diodes are respectively connected to the first terminals of the upper arm semiconductor switches.

6. The device for suppressing high-voltage electricity of claim 1, wherein each of the up arm semiconductor switches and each of the low arm semiconductor switches respectively has a MOSFET.

7. The device for suppressing high-voltage electricity of claim 1, wherein the electric generator further comprises a stator coil, which senses an electrical torque of the three-phase circuit to generate electricity; a frequency of the PWM signals generated by the control circuit is higher than a frequency of the voltage waveform sensed by the stator coil.

8. A method of suppressing high-voltage electricity, wherein the method is applied in the device as defined in claim 1, comprising the steps of:

A. sensing the voltage outputted by the three-phase circuit or the voltage provided to the battery, and comparing the voltage with the upper-bound voltage;

B. turning off an excitation current of the electric generator to stop generating electric power; controlling the control circuit to provide the PWM signals to the low arm semiconductor switches to turn on and off the low arm semiconductor switches accordingly if the voltage is higher than the upper-bound voltage; and C. repeating step A if the voltage is lower than the upper-bound voltage.

9. The method of claim 8, wherein, in step B, during a time period of high potential, the PWM signals are high potential signals, which turn on all of the low arm semiconductor switches.

10. The method of claim 8, wherein, in step B, during a time period of low potential, the PWM signals are low potential signals, which turn off all of the low arm semiconductor switches, and make the diodes conduct.

11. The method of claim 8, wherein, in step B, the control circuit simultaneously provides the same PWM signals to each of the low arm semiconductor switches.

12. The method of claim 8, further comprising a step B' after step B and before step C, which turns on the excitation current of the electric generator to continue generating electric power if the voltage outputted by the three-phase circuit or the voltage provided to the battery is lower than the upper-bound voltage, and repeats step B otherwise.

13. The method of claim 8, wherein the electric generator further comprises a stator coil, which senses an electrical torque of the three-phase circuit to generate electricity; in step B, a frequency of the PWM signals generated by the control circuit is higher than a frequency of the voltage waveform sensed by the stator coil.

* * * * *